United States Patent [19]

Lodholz et al.

[11] Patent Number: 5,246,573

[45] Date of Patent: Sep. 21, 1993

[54] COG RAKE BAR SCREEN

[75] Inventors: John C. Lodholz, Doylestown, Pa.;
Allen N. Bolte, Lenexa, Kans.

[73] Assignee: FMC Corporation, Chicago, Ill.

[21] Appl. No.: 722,987

[22] Filed: Jun. 28, 1991

[51] Int. Cl.⁵ .......................... B01D 33/01; E02B 5/08
[52] U.S. Cl. .................. 210/159; 174/17 VA; 210/162
[58] Field of Search .............. 174/17 VA; 210/159, 210/162, 413; 310/87; 405/193

[56] References Cited

U.S. PATENT DOCUMENTS

| | | | |
|---|---|---|---|
| 3,267,868 | 8/1966 | Page | 310/87 X |
| 3,543,526 | 12/1970 | O'Neill et al. | 405/193 |
| 3,802,427 | 4/1974 | Banjavich | 405/193 X |
| 3,999,502 | 12/1976 | Mayer | 115/41 HT |
| 4,857,182 | 8/1989 | Jackson | 210/159 |
| 4,903,628 | 2/1990 | Lansford | 405/193 X |
| 4,917,796 | 4/1990 | Rudzinski | 210/159 |
| 5,032,263 | 7/1991 | Rudzinski | 210/159 |
| 5,167,803 | 12/1992 | Newton | 210/159 X |

Primary Examiner—Leo P. Picard
Assistant Examiner—David Tone
Attorney, Agent, or Firm—Henry C. Query, Jr.; Richard B. Megley

[57] ABSTRACT

Apparatus for protecting from water damage the electric motor which drives the cog rake bar screen of a waste water treatment plant. A shell of air impermeable material surrounds the motor and has an opening at the shell bottom to drain water. Various arrangements and devices prevent water or debris from entering the opening.

10 Claims, 2 Drawing Sheets

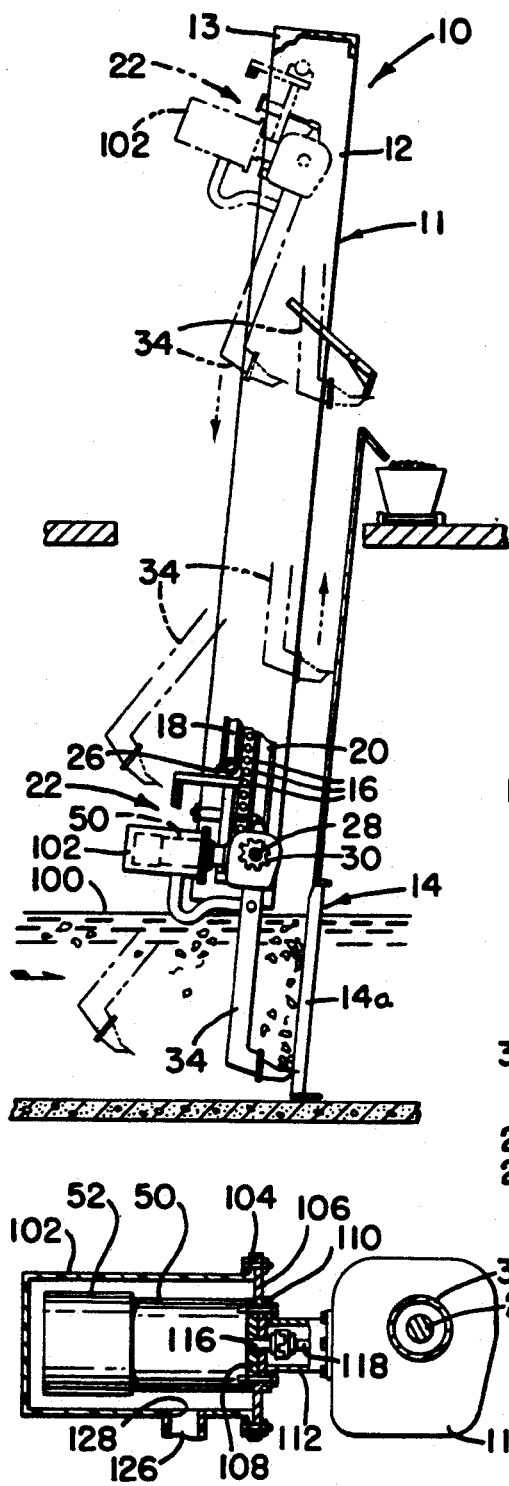
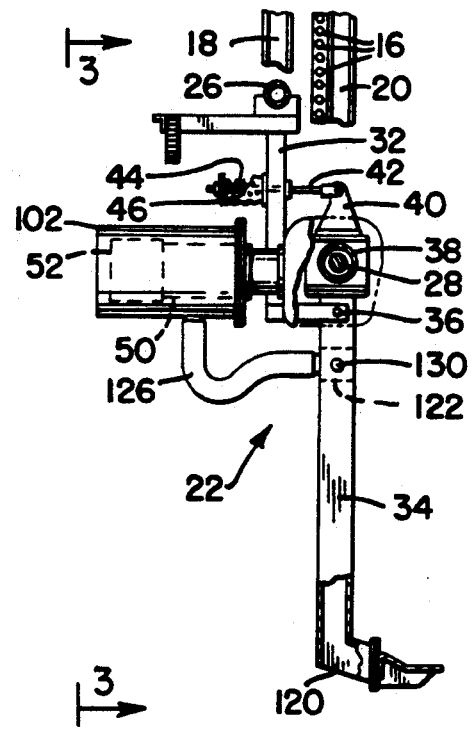
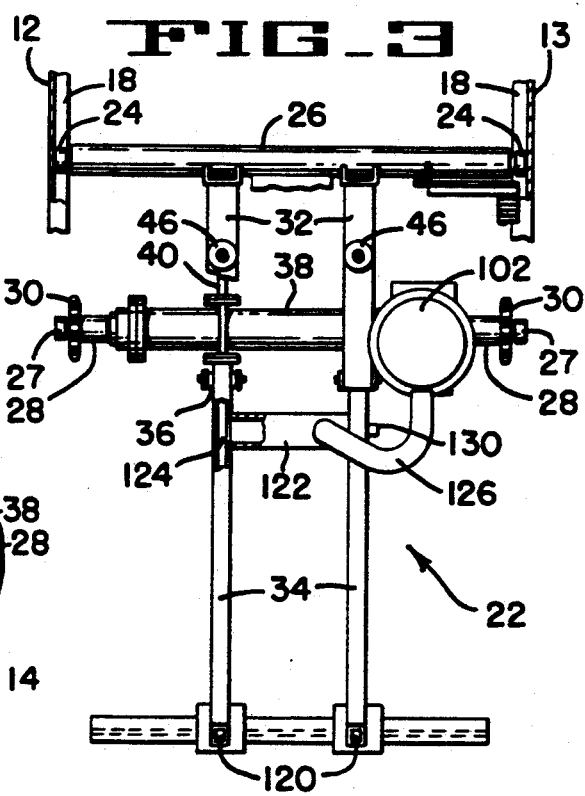

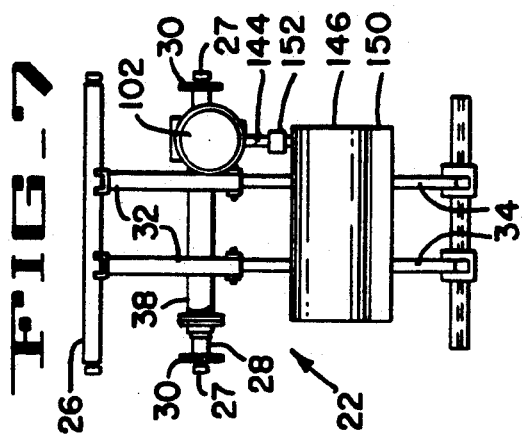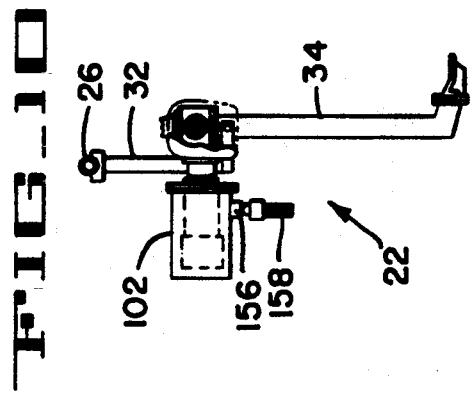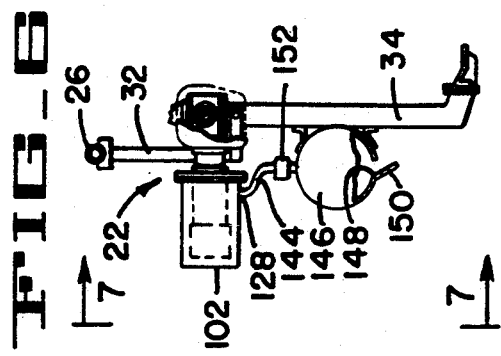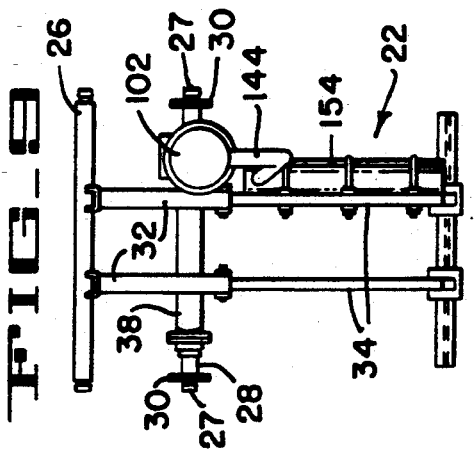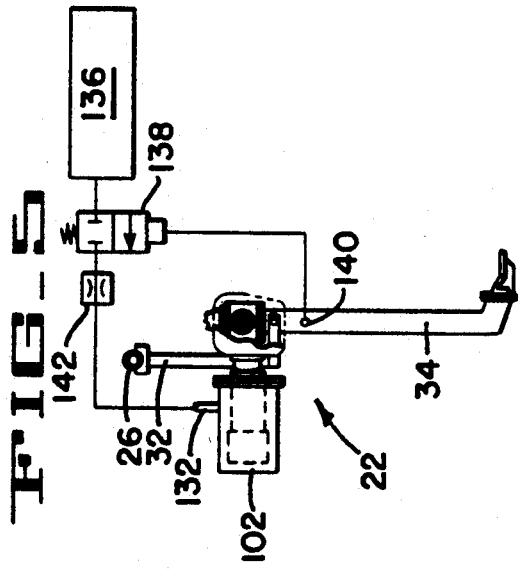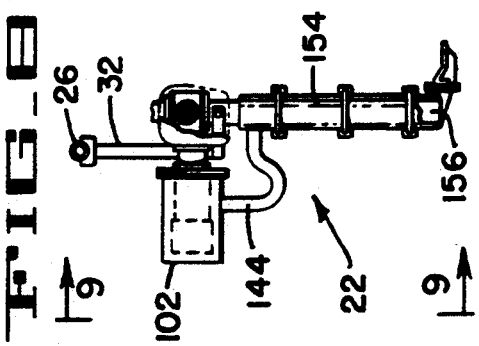

COG RAKE BAR SCREEN

This invention relates generally to cog rake bar screens generally, and more particularly to such screens powered by electric motors.

Cog rake bar screens are commonly used in waste water treatment plants to remove debris as it collects on the upstream side of bar screens or racks secured in and spanning the channel carrying the waste water. The level of the water in the channel may occasionally, such as from flooding due to heavy rainfall, be so high that the motor driving the rakes will become submerged during at least a portion of its operating cycle. In some retrofit installation the lack of head room will also result in the motor being submerged during a portion of the cycle even when water levels in the channel are at or near normal. Hydraulic motors can operate under water, but the strain imposed on the hydraulic hoses leading to and from the motors by the flowing water and the debris entrained therein often causes failure, either in the hose itself or at the connection of the hose with a coupling. Such a failure is unpredictable and will often result in the rake mechanism suddenly dropping to the bottom of the channel, making repair of the unit extremely difficult. Such a failure will also either release hydraulic fluid into the waste water, complicating treatment thereof, when the failed hose is at high pressure, or if the failed hose is a return line, will contaminate the hydraulic system with waste water, which at best will require extensive cleaning and at the worst will cause complete failure of component parts of the hydraulic system. Electric motors are, thus, the preferred mode of power, but prior attempts at intermittent submerged operation have been unsuccessful. One such attempt has been to completely seal the motor within a housing. The temperature differentials encountered during each cycle, between the high temperatures of the ambient atmosphere and the relatively cold water, and the lack of time for stabilization at either extreme make sealing the motor within an enclosure a most challenging, if not impossible, task. Any leakage of water into such an enclosure will, of course, accumulate, as will any condensate. Moisture in the air within the housing will quickly condense when immersed in the cold water. The quantity of water within the housing sufficient to cause failure of the electric motor is less than might be expected because the motor and its housing are tipped from horizontal during its operation. Another attempt has been to cover the motor with an open-bottomed bell. While avoiding the problems mentioned above regarding sealed housings, the bell traps floating debris, as the water is entered, and thereby allows such debris direct access to the motor itself, which can result in damage, and is ineffectual in trapping air because of the angle at which it enters the water and because of waves or other disturbances on the surface thereof.

The present invention provides an improved cog rake bar screen which avoids the problems of the prior art, which permits an electric motor to successfully operate during intermittent submerged conditions, which is reliable, which is relatively inexpensive to manufacture, maintain, and which may be readily retrofitted to existing installations. These and other attributes of the present invention will become more readily apparent from a perusal of the following description and the accompanying drawings, wherein:

FIG. 1 is a side elevational view, with portions broken away, of a cog rake bar screen incorporating one embodiment of the present invention;

FIG. 2 is a side elevational view of a portion of the mechanism shown in FIG. 1;

FIG. 3 is a view, with portions broken away, taken on line 3—3 of FIG. 2;

FIG. 4 is a vertical cross-section of a portion of the housing shown in FIG. 2;

FIG. 5 is a side elevational view, similar to FIG. 2, illustrating another embodiment of the invention;

FIG. 6 is also a side elevational view similar to FIG. 2 illustrating a further embodiment of the invention;

FIG. 7 is a view taken on line 7—7 of FIG. 6;

FIG. 8 is a side elevational view similar to FIG. 2 showing still another embodiment of the invention;

FIG. 9 is a view taken on line 8—8 of FIG. 8;

FIG. 10 is a side elevational view of a further embodiment of the present invention.

Referring now to FIGS. 1-3, there is shown a cog rake bar screen, indicated generally at 10, which has an inverted U-shaped frame 11, including side frame members 12 and 13 mounted over a water-carrying channel and adjacent to the upstream side of a bar screen 14. The screen 14 is secured in and spans the channel, and consists of vertical bars 14a spaced apart to permit flow of water therebetween, but sufficiently close to stop debris carried by the water from passing. An aligned row of evenly spaced cog pins 16 is secured on the inner side of each of the side frame members 12, 13 with an upstream guide track 18 and a downstream guide track 20 secured to each side frame member 12, 13 with the associated cog pins 16 between the tracks 18 and 20. The lower end of the tracks are connected by a complementary semi-circular track section (not shown) centered on the lowermost of the cog pins 16. A similar semi-circular track section centered on the uppermost of the cog pins 16 is provided at the upper end of the downstream track 20. This semi-circular track section intersects the upstream guide track below its upper end with a hinged flapper provided on the downstream flange of the upstream track, the purpose of which will be explained hereinafter.

A rake and drive assembly, indicated generally at 22, has guide roller 24 rotatably mounted in an upper tubular frame member 26 which spans the distance between the side frame members 12 and 13 so that rollers 24 engage and are constrained by the upstream guide tracks 18. Similar rollers 27 are rotatably mounted in a drive shaft 28 which also spans the distance between side frame members 12 and 13 and permits rollers 27 to engage the tracks 18 and 20. Cog wheels 30 are secured to each end of the drive shaft 28 and engage the cog pins 16. With the rollers 27 in the upstream track 18 and the assembly 22 positioned at or near the top of the side frame members 12 and 13, rotation of the shaft 28 and the cog wheels 30 in a counterclockwise direction as viewed in FIG. 1, the entire assembly will descend until the cog wheels 30 reach the lowermost of the cog pins 16. The cog wheels 30 will then rotate about that pin and the lower semi-circular track section will cause the rollers 27 to move from the upstream track 18 to the downstream track 20. Continued rotation of the cog wheels 30 in the same direction will then cause the entire assembly 22 to ascend until the cog wheels 30 reach the uppermost of the cog pins 16. The upper of the semi-circular tracks will then permit the guide rollers 27 to make a smooth transition from the downstream track 20 to the upstream track 18 as the cog wheels 30 rotate around the uppermost of the cog pins. The rollers 24 always remain in the upstream track 18, while the rollers 27 are guided by the upstream track 18 during descent and by the downstream track during ascent. This permits the debris on the screen 14 to remain undisturbed as the assembly 22 is lowered and to be removed as the assembly is raised, as will be described hereinafter.

A pair of L-shaped frame members 32 are secured to and depend downwardly from the tubular frame member 26. A pair of rake arms 34 are pivotally attached by pins 36 to the frame members 32. The drive shaft 28 is rotatably mounted in a torque tube 38 which is secured to the rake arms 34. A pair of pivot brackets 40 are secured to the torque tube 38. A rod 42 is pinned to each bracket 40 and extends through an opening in the frame member 32. A compression spring 44 is trapped between the frame member 32 and a spring retainer 46 held by a nut on the free threaded end of the rod 42. This permits the rake arms 34 to pivot about the pins 36 away from the screen 14 to clear debris that becomes wedged between the bars 14a of the screen 14.

The drive shaft 28 has a conventional wheel section which is engaged by a helical worm drive on the output from a reducer driven by the shaft of an electric motor 50. A spring-applied, electrically released brake 52 engaging the other of the double output shafts of the motor 50 assures that the entire assembly 22 will remain stationery when the motor 50 is not energized. Wires, not shown, to supply electricity to the motor 50 and brake 52 extend therefrom through a sealed opening in the plate 106 and to appropriate controls at the top of the frame 11 by means of what is commonly referred to as a power track. The cog rake bar screen 10 as thus far described is conventional.

In order to protect the motor 50 and brake 52 during those times when it would be submerged due to water levels being higher than normal, as indicated at 100 in FIG. 1, a housing 102 defining internal volume sufficient to encapsulate the motor 50 and the electrically actuated brake 52 has an outwardly projecting flange 104, which is secured to a mounting plate 106. The plate 106 is secured to a flange 108 formed on the housing of motor 50 and to the flange 110 on an adapter housing 112. The other end to the adapter housing 112 is secured to the housing 114 of the reducer and worm drive. The output shaft 116 is drivingly connected to the input shaft 118 of the reducer in the interior of the adapter housing 112. Conventional seals are provided between the various flanges and the associated housings or adapter plate to prevent the ingress of water. One advantage of this arrangement is that it permits removal of the housing 102 for service or repair of the brake 52 and/or the motor 50 without requiring the disconnection of the drive coupling between the shafts 116 and 118.

The rake arms 34 comprise sealed tubes with openings 120 at their lower ends and a hollow cross tube 122 sealingly connected therebetween. Appropriately positioned openings 124 in the inner walls of rake arms 34 permit communication between the arms 34 and the cross tube 122. A tube 126 is sealingly connected to the cross tube 122 and to an opening 128 formed in the bottom of the housing 102. Air is trapped in the rake arms 34, the cross tube 22, the tube 126 and the housing 102 as the rake arms 34 enter the water during the downward movement of the assembly 22. The air thus trapped is compressed as the assembly 22 is lowered further below the water level. The compressed air prevents entry of water into the housing 102. The relatively small openings 120 in the rake arms 34 minimize the adverse effects of wave action on the surface of the water during immersion. The arrangement also isolates the motor 50 and the brake 52 from debris carried by the water. When the assembly 22 is subsequently elevated, the lower ends of the rake arms 34 will once again be above the water level and exposed to the ambient atmosphere. Any condensate formed in the housing 102 while it was submerged in the cold water may now drain from the housing 102 through the openings, 128, the tube 126, the cross tube 122 and the arms 34. By positioning the cross tube 122 at an elevation below the housing 102, a water level sensor 130 can provide a warning when water in the arms 34 has risen to an abnormally high level and can cause the assembly 22 to shut down, immediately returning it to an elevated park position, as shown in FIG. 1, to prevent damage to the motor 50 and/or brake 52.

Referring now to FIG. 5, the housing 102 is provided with a small drain opening positioned along the bottom thereof to allow condensate to drain from the housing. An air hose 132 connects with the top of the housing and communicates with the interior thereof and with a source of compressed air 136. A two-position valve 138 is interposed in the air line 132 and is normally biased to a closed position, as shown in FIG. 5, but is shifted to an open position in response to a water level sensor 140. The water level sensor 140 is carried by and positioned on the arm 34 at an elevation below the housing 102 and causes the valve 138 to shift to an open position to direct compressed air from the source 136 to the housing 102 when the water level activates the sensor 140. The air under pressure directed to the housing 102 blocks the water from entering. A pressure reducing valve 142 may also be interposed in the air line 132 to minimize the loss of air through the drain opening in the housing 102, which will occur when the air pressure exceeds the water pressure at the drain opening.

The embodiment shown in FIGS. 6 and 7 is, like that of FIGS. 1–4, a passive system. The housing 102 has a hose 144 connected from its drain opening 128 to the top of a tank 146 secured to the rake arms 34. The tank 146 has an open slit 148 along the bottom thereof, but is otherwise air tight. A downwardly extending lip 150 is formed on or attached to the tank 146 along the upstream edge of the slit 148 to discourage debris from entering the tank 146. A check valve 152 is interposed in the hose 144 and permits flow only in the direction from the housing 102 to the tank 146. The embodiment of FIGS. 8 and 9 is similar to that of FIGS. 6 and 7, but employs a vertical tank 154 attached to one of the arms 34. The tank 154 has an open bottom 156 but is otherwise air tight. The hose 144 connects the housing 102 with the top of tank 154 and permits egress of condensate from the housing 102, when the assembly 22 is elevated above the water. The entire volume of air trapped within the tank 154, the hose 144 and the housing 102 is available for compression to offset the pressure exerted by the water when the assembly 22 is submerged.

The embodiment of FIG. 10 includes a sealed housing 102 with a check valve 156 secured in the drain opening to permit fluid flow from the interior of the housing 102 but blocking flow into the housing. A small amount of leakage past the valve 156 and into the housing can be tolerated because the housing 102, in most instances, will be submerged for only a short time. Once the assembly 22 has traveled upward, taking the check valve 156 above the water, the leakage along with any condensate will flow out of the housing 102 through the valve 156. The waste water is, however, filled with debris which could adversely affect the operation of the check valve 156. A relatively fine screen 158 is, therefore, provided on the outlet side of the check valve 156 to prevent water-borne debris from accessing the valve. In this embodiment, the check valve 156 comprises the sole means for preventing ingress of water into housing 102. In order to permit the free entry of air into the housing 102, when it is above the water, a flexible vent hose may have one end attached to the top of the housing 102 communicating with the interior thereof and the other end fixed at the top of the frame 11 and open to the atmosphere. This hose would be incorporated into the power track along with the electric wires for the motor and the brake.

While several embodiments of the present invention have been illustrated and described herein, it is to be understood that various changes and modifications can be made to any of them without departing from the spirit of the invention as defined by the scope of the appended claims.

What is claimed is:

1. In combination with a waste water treatment apparatus comprising a rake and a drive unit for the rake which becomes submerged in water during a portion of its operating cycle, the improvement which comprises an apparatus for protecting the drive unit from the water which includes:
    a shell formed of an air impermeable material;
    said shell defining an internal chamber of sufficient volume to contain the drive unit;
    said shell comprising a permanent opening; and
    means associated with said opening to entrap air within said chamber and block entry of water through said opening into said chamber while said drive unit is submerged and to permit communication between said chamber and the ambient atmosphere when said drive unit is not submerged.

2. The apparatus of claim 1 wherein said means comprises a check valve.

3. The apparatus of claim 1 wherein said means comprises a source of compressed air connected to said chamber.

4. The apparatus of claim 3 and further comprising a water level sensor positioned on said waste water treatment equipment at an elevation below said shell; and
    valve means interposed between said source and said shell, and responsive to said sensor sensing the presence of water to connect said source to said shell.

5. The apparatus of claim 1 wherein said means comprises a tank having an opening at its lower end but being otherwise air tight, and a hose connecting said chamber with said tank.

6. Apparatus for protecting a drive unit of waste water treatment equipment which becomes submerged in water during a portion of its operating cycle comprising:
    a shell formed of an air impermeable material;
    said shell defining an internal chamber of sufficient volume to contain the drive unit;
    means associated with said shell to block entry of water into said chamber while said drive unit is submerged and to permit communication between said chamber and the ambient atmosphere when said drive unit is not submerged;
    wherein said means comprises a source of compressed air connected to said chamber and a drain opening in the bottom of said shell;
    a water level sensor positioned on said waste water treatment equipment at an elevation below said shell; and
    valve means interposed between said source and said shell and responsive to said sensor sensing the presence of water to connect said source to said shell.

7. Apparatus for protecting a drive unit of waste water treatment equipment which becomes submerged in water during a portion of its operating cycle comprising:
    a shell formed of an air impermeable material;
    said shell defining an internal chamber of sufficient volume to contain the drive unit;
    means associated with said shell to block entry of water into said chamber while said drive unit is submerged and to permit communication between said chamber and the ambient atmosphere when said drive unit is not submerged; and
    wherein said means comprises a tank having an opening at its lower end but being otherwise air tight, and a hose connecting said chamber with said tank.

8. In combination with a waste water treatment apparatus comprising a rake and a drive unit for the rake which becomes submerged in water during a portion of its operating cycle, the improvement which comprises an apparatus for protecting the drive unit from the water which includes:
    a shell formed of an air impermeable material;
    said shell defining an internal chamber of sufficient volume to contain the drive unit;
    means associated with said shell to block entry of water into said chamber while said drive unit is submerged and to permit communication between said chamber and the ambient atmosphere when said drive unit is not submerged; and
    wherein said means comprises at least one hollow tubular member.

9. The apparatus of claim 8 further comprising at least one hollow rake arm having an opening at its lower end and means for connecting said tubular member with said rake arm.

10. An apparatus for protecting a drive unit of waste water treatment equipment which becomes submerged in water during a portion of its operating cycle comprising:
    a shell formed of an air impermeable material;
    said shell defining an internal chamber of sufficient volume to contain the drive unit;
    means associated with said shell to block entry of water into said chamber while said drive unit is submerged and to permit communication between said chamber and the ambient atmosphere when said drive unit is not submerged;
    wherein said means comprises at least one hollow tubular member and at least one hollow rake arm having an opening at its lower end and means for connecting said tubular member with said rake arm.

* * * * *